United States Patent [19]

Guswiler

[11] 4,043,057
[45] Aug. 23, 1977

[54] TEACHING AID

[76] Inventor: Gerald W. Guswiler, Box 282, Penney Farms, Fla. 32079

[21] Appl. No.: 708,273

[22] Filed: July 23, 1976

[51] Int. Cl.² .............................................. G09B 1/22
[52] U.S. Cl. ........................................ 35/74; 35/31 A
[58] Field of Search ....................... 35/31 A, 35 F, 74; 40/113

[56] References Cited

U.S. PATENT DOCUMENTS

| 536,526 | 3/1895 | Hooley | 35/74 X |
| 1,985,652 | 12/1934 | Campbell | 35/31 A X |
| 2,548,553 | 4/1951 | Neves | 40/113 |
| 2,692,444 | 10/1954 | Lindsley | 35/35 F |
| 2,810,211 | 10/1957 | Zesbaugh | 35/74 X |

FOREIGN PATENT DOCUMENTS

| 961,792 | 11/1949 | France | 35/31 A |
| 1,228,284 | 3/1960 | France | 35/35 F |
| 183,999 | 8/1922 | United Kingdom | 35/74 |

Primary Examiner—Harland S. Skogquist
Attorney, Agent, or Firm—George H. Baldwin; Arthur G. Yeager

[57] ABSTRACT

An arithmetic teaching aid with a front and a back sheet of the same size and shape in superposed alignment. A spacing lug is disposed between the sheets at each of four corners thereof. A large disc and two series of smaller discs, each series comprising three smaller discs having equal diameters are rotatively disposed between the sheets and along a side edge of the sheets. The front sheet has openings through which numerical indicia on the discs is visible.

1 Claim, 5 Drawing Figures

TEACHING AID

The present invention relates to educational aids, and in particular a counter having an assembly of small meshing discs with numerals thereon in combination with a large disc also having numerals thereon in which the discs are rotatably mounted in a supporting backing including spaced layers of stiff material with the discs between the layers.

The purpose of this invention is to provide teachers of the first, second and third grades of elementary educational schools with mechanical means to explain and illustrate arithmetic and numerical values.

The teaching aid helps the teachers to hold the attention of the children while they are learning numerical values, such as - addition - subtraction and multiplication.

It has been proven that each child provided with one of the aids of this invention will concentrate on the lesson, working out numerical values, and group accomplishment is greatly stimulated.

The object of this invention is, therefore, to provide means for stimulating interest in instruction by combining physical elements with numerical values, particularly with young children.

Another object of the invention is to provide a teaching aid in which the possibility of error is substantially eliminated.

Another important object of the invention is to provide a teaching aid in which each individual pupil actuates elements of the aid.

A further object of the invention is to provide a teaching aid in which the individual elements of the aid are readily reset after each problem.

A still further object is to provide an improved teaching aid which combines physical elements with numerical values in which the aid is of simple and economical construction.

Other and further objects and advantages of the present invention will be apparent from the following detailed description, drawings and claims, the scope of the invention not being limited to the illustrations of the drawings, as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claims.

With these and other objects and advantages in view the invention embodies spaced layers of relatively stiff sheet material, a large disc, having numerals thereon, positioned between the layers of material and rotatably mounted therein, and a plurality of small meshing or overlapping discs, also having numerals thereon, and also positioned between said layers of material, rotatably mounted in said layers, one of said sheets or layers of material having windows therein, and said discs being positioned whereby the small discs protrude from sides of the layers of material whereas the large disc protrudes from one of the ends thereof.

Other features and advantages of the invention will appear from the following description taken in connection with the drawings, wherein.

Figure 1:
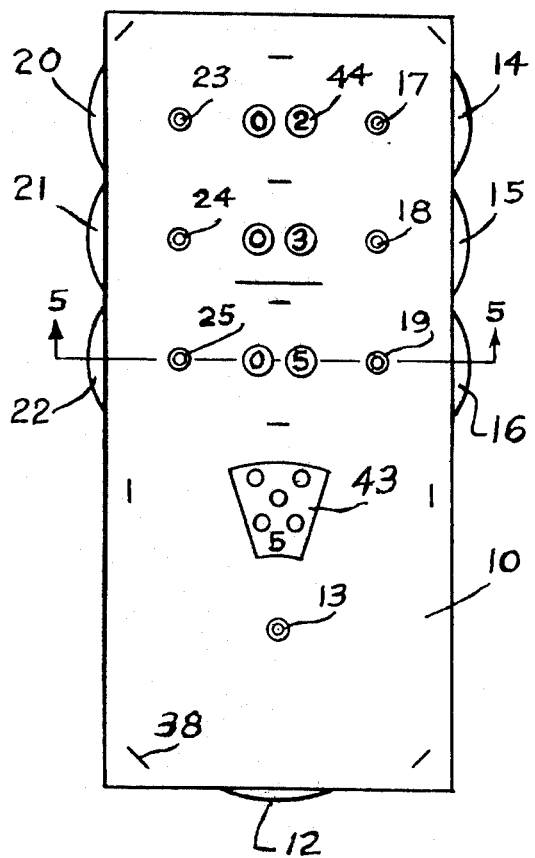
FIG. 1 is a front elevational view of the teaching aid.
Figure 2:
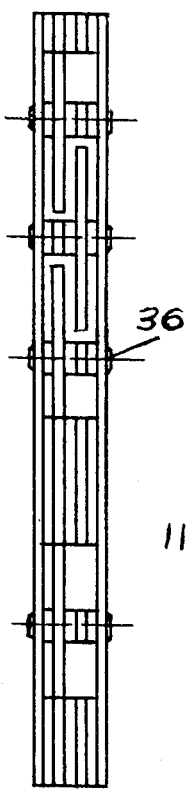
FIG. 2 is a side elevational view of the teaching aid.
Figure 3:
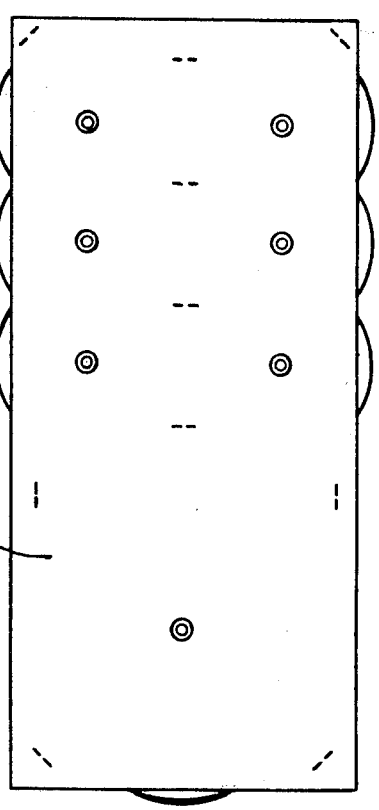
FIG. 3 is a rear elevational view of the aid.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numerals 10 and 11 refer to the side plates or sheets of stiff material, numeral 12 indicating a large disc positioned between the plates 10 and 11 and rotatably mounted by a pin or hollow rivet 13, numerals 14, 15 and 16 small discs rotatably mounted by pins 17, 18 and 19 on one side of the aid, and numerals 20, 21 and 22 small discs rotatably mounted by pins 23, 24 and 25 on the opposite side.

The side plates, sheets, or layers of stiff material are retained in spaced relation by lugs 26, 27 and 28 at the top, 29 and 30 at the bottom, 31, 32 and 33 in the intermediate part, and 34 and 35 in the upper part. The thickness of the spacing elements is such that the discs, and particularly the overlapping discs rotate freely when in use.

The discs may be rotatably mounted by pins of any description, although it is preferred to use hollow or tubular rivets, with the ends of the rivets peened over providing flanges 36. Washers 37 may also be provided on one of the ends of the rivets.

The side plates or sheets of material are secured together by staples 38 and the staples are located to correspond with the spacing lugs.

Figure 4:
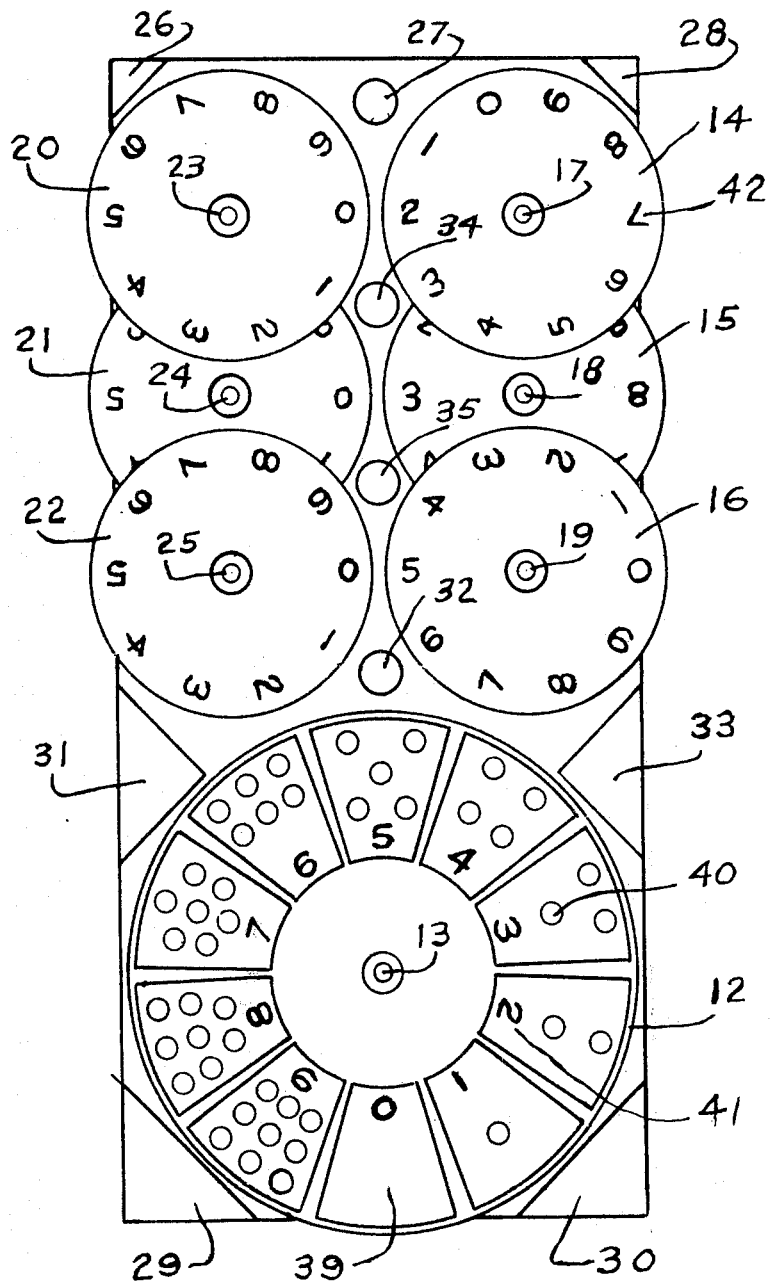
FIG. 4 is a front elevational view of the aid, similar to that shown in FIG. 1, with the sheet or layer of material on the near side of the aid omitted, and showing, in particular, the arrangement of the numeral carrying discs in the aid.
Figure 5:
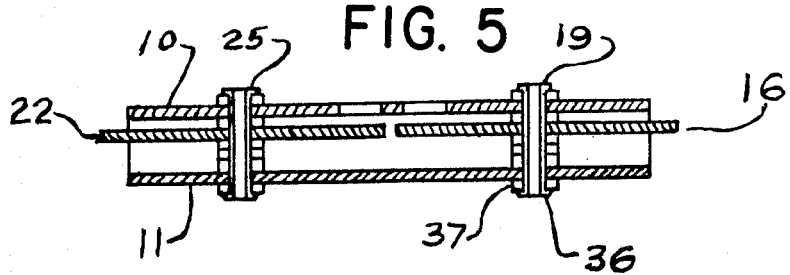
FIG. 5 is a cross section through the teaching aid, taken on line 5 — 5 of FIG. 1, illustrating the rotatable mounting of the discs in the side members of the aid.

The face of the disc 12 is divided into segments 39 in the outer portions of which are groups of dots 40, and the numbers of dots in the groups may be designated by numerals 41 on the inner surfaces of the segments, as shown in FIG. 4.

The outer edges of the small discs may be provided with numerals 42, such as from 1 to 0, as shown.

The side plate or sheet 10 is provided with a window 43 that is positioned to register with the segments 39 of the disc 12 and small windows 44, also in the plate 10, are positioned to register with the numerals 42.

In use, and as an example, numerals of the small discs indicating quantities to be added, subtracted, or multiplied are set, by turning the small discs, and the large disc is turned until the sum, difference, quotient or total shows through the window 43, whereby the answer is obtained by mechanical means in combination with numerical values. The aid may also be used for other purposes.

From the foregoing description, it is thought to be obvious that a teaching aid constructed in accordance with this invention is particularly well adapted for use by reason of the convenience and facility with which it may be assembled and operated, and it will also be obvious that the invention is susceptible of some change and modification without departing from the principles and spirit thereof, and for this reason it is not desired to limit the invention to the precise arrangement and formation of the several parts herein shown in carrying out the invention in practice, except as claimed.

What is claimed is:

1. An arithmetic teaching aid comprising a front and a back sheet of sheet material, said sheets being of the same size and of the same rectangular shape and in superposed alignment, a respective spacing lug disposed between said sheets at each of the four corners thereof, a first disc of sheet material having a diameter equal to substantially the width dimension of said sheets and disposed therebetween and centered with respect to the side edges of said sheets and having an edge portion projecting from one end edge of said sheets for manual rotation thereof, two series of smaller sheet material discs, each series comprising three such smaller discs and said smaller discs having equal diameters equal to substantially one half of said width dimension, said smaller discs of each said series being disposed between said sheets and along a respective said side edge of said sheets and with an edge portion of each said smaller disc exposed for manual rotation thereof at the respective said side edge, respective mounting means passing through the center of each said disc and rotatively mounting each respective disc to said sheets, the centers of the three discs of each said series being spaced equally inwardly of the respective said side edge of said sheets and being spaced apart each to the next disc of the series by a distance less than the diameter and greater than the radius of such discs and the center one of the three discs of each said series being disposed in a plane closer to one of said sheets than the other two discs of the respective series whereby said one disc of each said series laps with said other two discs, each said disc of each said series being aligned opposite to a corresponding said disc of the other said series, the centers of said corresponding discs being located apart by slightly more than the diametrical dimension of said smaller discs to provide a small clearance distance between their perimetrical edges midway between said side edges of said sheets, said front sheet being provided with a column of window openings which, when said sheets are in upright position with the end edge opposite said one end edge at the top, is upright, extends downwardly from adjacent said top edge and is centered between said side edges and which said column comprises three pairs of window openings, the openings of each said pair being closely adjacent each other and aligned side-by-side between said centers of respective said corresponding discs, each of said smaller discs having numerals from 0 to 9 thereon arranged in a ring adjacent its periphery and said numerals of each disc being located alignably with a respective said window opening to be visible individually seriatim through the respective window opening with rotation of the disc, whereby, when viewing said front face in such upright position, one pair of side-by-side digital numerals appear in an upper pair of said window openings aligned above another pair of such numerals in an intermediate pair of said window openings and a third pair of such side-by-side ditigal numerals appear alignedly below said other pair of such numerals through the third said pair of window openings, said first disc being provided with a plurality of arithmetic indicia disposed in a ring adjacent its periphery, said front sheet being provided with a further window opening aligned with said last ring for exposing said indicia individually seriatim with rotation of said first disc, said first disc and said further window opening being disposed below said third pair of window openings when said sheets are so oriented in said upright position.

* * * * *